(12) United States Patent
Zhou

(10) Patent No.: US 9,467,535 B2
(45) Date of Patent: Oct. 11, 2016

(54) DATA TRANSMISSION METHOD, NETWORK ELEMENT DEVICE AND COMMUNICATION SYSTEM

(71) Applicant: Huawei Technologies Co., Ltd., Shenzhen, Guangdong (CN)

(72) Inventor: Junping Zhou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 161 days.

(21) Appl. No.: 14/579,519

(22) Filed: Dec. 22, 2014

(65) Prior Publication Data
US 2015/0110133 A1 Apr. 23, 2015

Related U.S. Application Data

(63) Continuation of application No. PCT/CN2012/077998, filed on Jun. 30, 2012.

(51) Int. Cl.
| | |
|---|---|
| *H04L 12/927* | (2013.01) |
| *H04W 80/06* | (2009.01) |
| *H04W 76/02* | (2009.01) |
| *H04W 28/02* | (2009.01) |
| *H04L 29/06* | (2006.01) |
| *H04L 12/911* | (2013.01) |
| *H04W 76/04* | (2009.01) |

(52) U.S. Cl.
CPC ............ *H04L 69/08* (2013.01); *H04L 47/78* (2013.01); *H04L 69/164* (2013.01); *H04W 28/0268* (2013.01); *H04W 76/022* (2013.01); *H04W 80/06* (2013.01); *H04W 76/041* (2013.01)

(58) Field of Classification Search
CPC ........... H04L 69/164; H04L 29/06122; H04L 47/24–47/2491; H04W 80/06; H04W 76/022; H04W 28/0268
See application file for complete search history.

(56) References Cited

U.S. PATENT DOCUMENTS

| | | | |
|---|---|---|---|
| 6,977,896 B1 | 12/2005 | Kobayashi | |
| 7,778,242 B1 | 8/2010 | Barany et al. | |
| 2002/0054584 A1 | 5/2002 | Dempo | |
| 2003/0099196 A1 | 5/2003 | Sebire | |
| 2007/0011556 A1 | 1/2007 | Gentric | |
| 2007/0104224 A1* | 5/2007 | Conner | H04L 1/0083 370/474 |
| 2008/0107119 A1* | 5/2008 | Chen | H04L 12/5695 370/395.21 |

(Continued)

FOREIGN PATENT DOCUMENTS

| | | |
|---|---|---|
| CN | 1608359 A | 4/2005 |
| CN | 1860713 A | 11/2006 |

(Continued)

OTHER PUBLICATIONS

S. Deering, et al., "Internet Protocol, Version 6 (IPv6) Specification", Network Working Group, Dec. 1998, 42 pages.

(Continued)

*Primary Examiner* — Hoon J Chung

(57) ABSTRACT

Embodiments of the present invention provide a data transmission method, a network element device and a communication system. The technical solutions provided in the embodiments of the present invention can encapsulate some services having a high packet error resilient into UDP-Lite protocol packets, which, compared with the prior art, omits check on loads of the messages, thereby significantly improving data transmission efficiency.

16 Claims, 7 Drawing Sheets

(56) References Cited

U.S. PATENT DOCUMENTS

2008/0305772 A1 12/2008 Balasubramanian et al.
2012/0039240 A1 2/2012 Han et al.
2015/0016320 A1 1/2015 Pelletier et al.

FOREIGN PATENT DOCUMENTS

| CN | 101072183 A | 11/2007 |
|---|---|---|
| CN | 101461143 A | 6/2009 |
| CN | 101877860 A | 11/2010 |
| CN | 101877915 A | 11/2010 |
| JP | 2003-032678 A | 1/2003 |
| RU | 2424627 C2 | 7/2011 |
| RU | 2009149670 A | 7/2011 |
| WO | WO 2005/015854 A1 | 2/2005 |
| WO | WO 2008/104099 A1 | 9/2008 |

OTHER PUBLICATIONS

L-A. Larzon, et al., "The Lightweight User Datagram Protocol (UDP-Lite)", Network Working Group, Jul. 2004, 12 pages.

"3rd Generation Partnership Project; Technical Specification Group Services and System Aspects; General Packet Radio Service (GPRS); Service description; Stage 2 (Release 9)", 3GPP TS 23.060 v9.7.0, Dec. 2010, 300 pages.

"3rd Generation Partnership Project; Technical Specification Group Services and System Aspects; General Packet Radio Service (GPRS) enhancements for Evolved Universal Terrestrial Radio Access Network (E-UTRAN) access (Release 10)", 3GPP TS 23.401 v10.1.0, Sep. 2010, 271 pages.

* cited by examiner

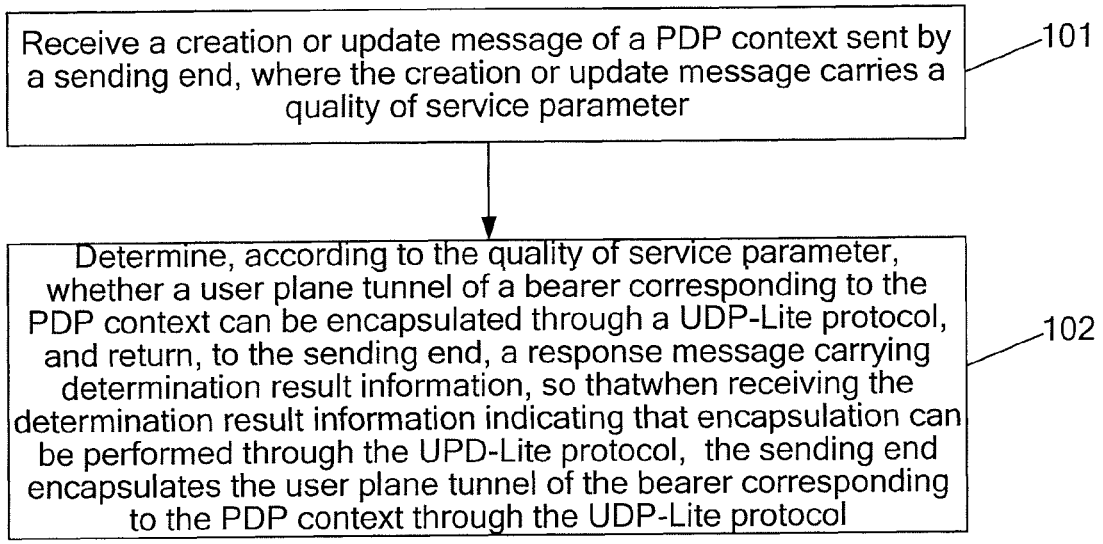

DATA TRANSMISSION METHOD, NETWORK ELEMENT DEVICE AND COMMUNICATION SYSTEM

CROSS-REFERENCE TO RELATED APPLICATIONS

This application is a continuation of International Application No. PCT/CN2012/077998, filed on Jun. 30, 2012, which is hereby incorporated by reference in its entirety.

TECHNICAL FIELD

The present invention relates to the wireless communication technologies, and in particular, to a data transmission method, a network element device and a communication system.

BACKGROUND

The IPv6 (Internet Protocol Version 6, Internet protocol version 6) technology has been increasingly mature, and has more and more applications. Meanwhile, IPv4 (Internet Protocol Version 4, Internet protocol version 4) addresses available for allocation are increasingly diminishing, evolution to IPv6 supported by a mobile broadband network is imperative.

After a PS (Packet Switch, packet switch) domain core network of the mobile broadband network evolves to the IPv6, for example, after a data transmission interface between an SGSN (Serving GPRS Support Node, serving general packet radio service support node) and an S-GW (Serving Gateway, serving gateway), a data transmission interface between an MME (Mobility Management Entity, mobility management entity) and an SGSN, a data transmission interface between an S-GW and an RNC (Radio Network Controller, radio network controller), and a data transmission interface between an S-GW and an eNodeB (Evolved Node B, evolved Node B) all support IPv6 transmission, GTP (GPRS Tunneling Protocol, general packet radio service tunneling protocol) has to be borne on UDP (User Datagram Protocol, user datagram protocol) of the IPv6, and a checksum must be calculated for all GTP packets on a control plane and a user plane. The checksum calculation of the UDP includes checksum calculation of a UDP header and checksum calculation of a UDP load. The checksum of the UDP is calculated by a sending end, and then verified by a receiving end, and if the receiving end detects that the checksum has an error, a GTP packet has to be discarded. In some situations, the cost of discarding the packet is very large, especially for services having large packets such as audios or videos. Performing the checksum calculation of the UDP on services having a better packet error resilient such as audios or videos significantly reduces data transmission efficiency.

SUMMARY

Various aspects of the present invention provide a data transmission method, for improving the data transmission efficiency.

A first aspect of the present invention provides a data transmission method, which includes:

receiving a create or update message of a PDP context sent by a sending end, where the create or update message carries a quality of service parameter;

determining, according to the quality of service parameter, whether user plane tunnel data of a bearer corresponding to the PDP context can be encapsulated through a UDP-Lite protocol, and returning, to the sending end, a response message carrying determination result information, so that when receiving the determination result information indicating that encapsulation can be performed through the UPD-Lite protocol, the sending end encapsulates the user plane tunnel data of the bearer corresponding to the PDP context through the UDP-Lite protocol.

In the data transmission method, the determining, according to the quality of service parameter, whether the user plane tunnel data of the bearer corresponding to the PDP context can be encapsulated through the UDP-Lite protocol includes:

acquiring a first threshold and a second threshold; and determining, whether a code error resilient in the quality of service parameter of the PDP context is greater than the first threshold and whether a packet loss tolerance in the quality of service parameter of the PDP context is greater than the second threshold, and if both yes, determining that the user plane tunnel data of the bearer corresponding to the PDP context can be encapsulated through the UDP-Lite protocol.

A second aspect of the present invention provides a data transmission method, which includes:

sending a create or update message of a PDP context to a receiving end, where the create or update message carries a quality of service parameter;

receiving a create or update response message returned by the receiving end, where the response message is returned by the receiving end according to the create or update message, the response message carries determination result information, and the determination result information is a result of determining, by the receiving end according to the quality of service parameter, whether user plane tunnel data of a bearer corresponding to the PDP context can be encapsulated through a UDP-Lite protocol; and if the determination result information carried in the response message indicates that encapsulation can be performed through the UPD-Lite protocol, encapsulating the user plane tunnel data of the bearer corresponding to the PDP context through the UDP-Lite protocol.

In the data transmission method, the encapsulating the user plane tunnel data of the bearer corresponding to the PDP context through the UDP-Lite protocol specifically includes:

encapsulating the user plane tunnel data of the bearer corresponding to the PDP context into a data transmission protocol packet through the UDP-Lite protocol, and setting a checksum coverage field in a packet header of the data transmission protocol packet to a preset value.

A third aspect of the present invention provides a data transmission method, which includes:

receiving a create or update message of a bearer sent by a sending end, the create or update message carries a quality of service parameter of the bearer; and determining, according to the quality of service parameter, whether a user plane tunnel data of the bearer can be encapsulated through a UDP-Lite protocol, and returning, to the sending end, a response message carrying determination result information, so that when receiving the response message carrying the determination result information indicating that encapsulation can be performed through the UPD-Lite protocol, the sending end encapsulates the user plane tunnel data of the bearer through the UDP-Lite protocol.

In the data transmission method, the determining, according to the quality of service parameter, whether the user plane tunnel data of the bearer can be encapsulated through the UDP-Lite protocol includes:

acquiring a first threshold and a second threshold; and determining, whether a code error resilient in the quality of service parameter of the bearer is greater than the first threshold and whether a packet loss tolerance in the quality of service parameter of the bearer is greater than the second threshold, and if both yes, determining that the user plane tunnel data of the bearer can be encapsulated through the UDP-Lite protocol.

A fourth aspect of the present invention provides a data transmission method, which includes:

sending a create or update message of a bearer to a receiving end, where the create or update message carries a quality of service parameter of the bearer;

receiving a create or update response message returned by the receiving end, where the response message is returned by the receiving end according to the create or update message, the response message carries determination result information, and the determination result information is a result of determining, by the receiving end according to the quality of service parameter, whether a user plane tunnel data of the bearer can be encapsulated through the UDP-Lite protocol; and if the determination result information carried in the response message indicates that encapsulation can be performed through the UPD-Lite protocol, encapsulating the user plane tunnel data of the bearer through the UDP-Lite protocol.

In the data transmission method, the encapsulating the bearer through the UDP-Lite protocol specifically includes:

encapsulating the user plane tunnel data of the bearer into a data transmission protocol packet through the UDP-Lite protocol, and setting a checksum coverage field in a packet header of the data transmission protocol packet to a preset value.

A fifth aspect of the present invention provides a data transmission method, which includes:

creating or updating a bearer, and determining, according to a quality of service parameter of the bearer, whether a user plane tunnel data of the bearer can be encapsulated through a UDP-Lite protocol; and sending, to the receiving end, an instruction information carrying determination result information, so that when receiving the determination result information indicating that encapsulation can be performed through the UPD-Lite protocol, the receiving end encapsulates the user plane tunnel data of the bearer through the UDP-Lite protocol.

In the data transmission method, the determining, according to the quality of service parameter of the bearer, whether the user plane tunnel data of the bearer can be encapsulated through the UDP-Lite protocol, includes:

acquiring a first threshold and a second threshold; and determining, whether a code error resilient in the quality of service parameter of the bearer is greater than the first threshold and whether a packet loss tolerance in the quality of service parameter of the bearer is greater than the second threshold, and if both yes, determining that the user plane tunnel data of the bearer can be encapsulated through the UDP-Lite protocol.

A sixth aspect of the present invention provides a data transmission method, which includes:

receiving instruction information sent by a sending end, where the instruction information carries determination result information, and the determination result information is a result of determining, by the sending end according to a quality of service parameter of a created or updated bearer, whether a user plane tunnel data of the bearer can be encapsulated through a UDP-Lite protocol; and if the determination result information carried in the instruction information indicates that encapsulation can be performed through the UPD-Lite protocol, encapsulating the user plane tunnel data of the bearer through the UDP-Lite protocol.

In the data transmission method, the encapsulating the user plane tunnel data of the bearer through the UDP-Lite protocol specifically includes:

encapsulating the user plane tunnel data of the bearer into a data transmission protocol packet through the UDP-Lite protocol, and setting a checksum coverage field in a packet header of the data transmission protocol packet to a preset value.

A seventh aspect of the present invention provides a network element device, which includes:

a receiving unit, configured to receive a create or update message of a PDP context sent by a sending end, where the create or update message carries a quality of service parameter;

a determining unit, configured to determine, according to the quality of service parameter, whether user plane tunnel data of a bearer corresponding to the PDP context can be encapsulated through a UDP-Lite protocol, so as to obtain a determination result; and a sending unit, configured to return, to the sending end, a response message carrying the determination result information, so that when receiving the determination result information indicating that encapsulation can be performed through the UPD-Lite protocol, the sending end encapsulates the user plane tunnel data of the bearer corresponding to the PDP context through the UDP-Lite protocol.

In the network element device, the determining unit is specifically configured to acquire a first threshold and a second threshold, determine, whether a code error resilient in the quality of service parameter of the PDP context is greater than the first threshold and whether a packet loss tolerance in the quality of service parameter of the PDP context is greater than the second threshold, and if both yes, obtain a determination result that the user plane tunnel data of the bearer corresponding to the PDP context can be encapsulated through the UDP-Lite protocol; otherwise, obtain a determination result that the user plane tunnel data of the bearer corresponding to the PDP context cannot be encapsulated through the UDP-Lite protocol.

An eighth aspect of the present invention provides a network element device, which includes:

a sending unit, configured to send a create or update message of a PDP context to a receiving end, where the create or update message carries a quality of service parameter;

a receiving unit, configured to receive a create or update response message returned by the receiving end, where the response message is returned by the receiving end according to the create or update message, the response message carries determination result information, and the determination result information is a result of determining, by the receiving end according to the quality of service parameter, whether user plane tunnel data of a bearer corresponding to the PDP context can be encapsulated through the UDP-Lite protocol; and an encapsulating unit, configured to, when the determination result information carried in the response message indicates that encapsulation can be performed through the UPD-Lite protocol, encapsulate the user plane tunnel data of the bearer corresponding to the PDP context through the UDP-Lite protocol.

In the network element device, the encapsulating unit is specifically configured to encapsulate the user plane tunnel data of the bearer corresponding to the PDP context into a data transmission protocol packet through the UDP-Lite protocol, and set a checksum coverage field in a packet header of the data transmission protocol packet to a preset value.

A ninth aspect of the present invention provides a network element device, which includes:

a receiving unit, configured to receive a create or update message of a bearer sent by a sending end, where the create or update message carries a quality of service parameter of the bearer;

a determining unit, configured to determine, according to the quality of service parameter, whether a user plane tunnel data of the bearer can be encapsulated through a UDP-Lite protocol, so as to obtain a determination result; and a sending unit, configured to return, to the sending end, a response message carrying the determination result information, so that when receiving the response message carrying the determination result information indicating that encapsulation can be performed through the UPD-Lite protocol, the sending end encapsulates the user plane tunnel data of the bearer through the UDP-Lite protocol.

In the network element device, the determining unit is specifically configured to acquire a first threshold and a second threshold, determine, whether a code error resilient in the quality of service parameter of the bearer is greater than the first threshold and whether a packet loss tolerance in the quality of service parameter of the bearer is greater than the second threshold, and if both yes, obtain a determination result that the user plane tunnel data of the bearer can be encapsulated through the UDP-Lite protocol; otherwise, obtain a determination result that the user plane tunnel data of the bearer cannot be encapsulated through the UDP-Lite protocol.

A tenth aspect of the present invention provides a network element device, which includes:

a sending unit, configured to send a create or update message of a bearer to a receiving end, where the create or update message carries a quality of service parameter of the bearer;

a receiving unit, configured to receive a create or update response message returned by the receiving end, where the response message is returned by the receiving end according to the create or update message, the response message carries determination result information, and the determination result information is a result of determining, by the receiving end according to the quality of service parameter, whether a user plane tunnel data of the bearer can be encapsulated through a UDP-Lite protocol; and an encapsulating unit, configured to, when the determination result information carried in the response message indicates that encapsulation can be performed through the UPD-Lite protocol, encapsulate the user plane tunnel data of the bearer through the UDP-Lite protocol.

In the network element device, the encapsulating unit is specifically configured to, when the response message carries the determination result information indicating that encapsulation can be performed through the UPD-Lite protocol, encapsulate the user plane tunnel data of the bearer into a data transmission protocol packet through the UPD-Lite protocol, and set a checksum coverage field in a packet header of the data transmission protocol packet to a preset value.

An eleventh aspect of the present invention provides a network element device, which includes:

a creating or updating unit, configured to create or update a bearer;

a determining unit, configured to determine, according to a quality of service parameter of the bearer, whether a user plane tunnel data of the bearer can be encapsulated through a UDP-Lite protocol, so as to obtain a determination result; and a sending unit, configured to send an instruction information carrying determination result information to a receiving end, so that when receiving the determination result information indicating that encapsulation can be performed through the UPD-Lite protocol, the sending end encapsulates the user plane tunnel data of the bearer through the UDP-Lite protocol.

In the network element device, the determining unit is specifically configured to acquire a first threshold and a second threshold, determine, whether a code error resilient in the quality of service parameter of the bearer is greater than the first threshold and whether a packet loss tolerance in the quality of service parameter of the bearer is greater than the second threshold, and if both yes, obtain a determination result that the user plane tunnel data of the bearer can be encapsulated through the UDP-Lite protocol; otherwise, obtain a determination result that the user plane tunnel data of the bearer cannot be encapsulated through the UDP-Lite protocol.

A twelfth aspect of the present invention provides a network element device, which includes:

a receiving unit, configured to receive instruction information sent by a sending end, where the instruction information carries determination result information, and the determination result information is a result of determining, by the sending end according to a quality of service parameter of a created or updated bearer, whether a user plane tunnel data of the bearer can be encapsulated through a UDP-Lite protocol; and an encapsulating unit, configured to, when the instruction information carries the determination result information indicating that encapsulation can be performed through the UPD-Lite protocol, encapsulate the user plane tunnel data of the bearer through the UDP-Lite protocol.

In the network element device, the encapsulating unit is specifically configured to encapsulate the user plane tunnel data of the bearer into a data transmission protocol packet through the UDP-Lite protocol, and set a checksum coverage field in a packet header of the data transmission protocol packet to a preset value.

A thirteenth aspect of the present invention provides a communication system, which includes at least one group of network element devices configured to transmit data, and the foregoing network element devices are adopted as the network element devices.

It can be known from the technical solutions that, in the present invention, by determining the quality of service parameter of the bearer, it is determined whether to encapsulate the bearer through UDP-Lite. For services having a high packet error resilient, such as audios and videos, UDP-Lite encapsulation can be implemented by using the technical solutions provided in the present invention, and compared with the prior art in which all PDP context or bearers are encapsulated through the UPD protocol, check for a load of a packet is omitted, and data transmission efficiency is improved significantly.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

FIG. 1 is a schematic flow chart of a first embodiment of a data transmission method according to the present invention;

FIG. 2 is a schematic flow chart of a second embodiment of a data transmission method according to the present invention;

DETAILED DESCRIPTION

Figure 3:
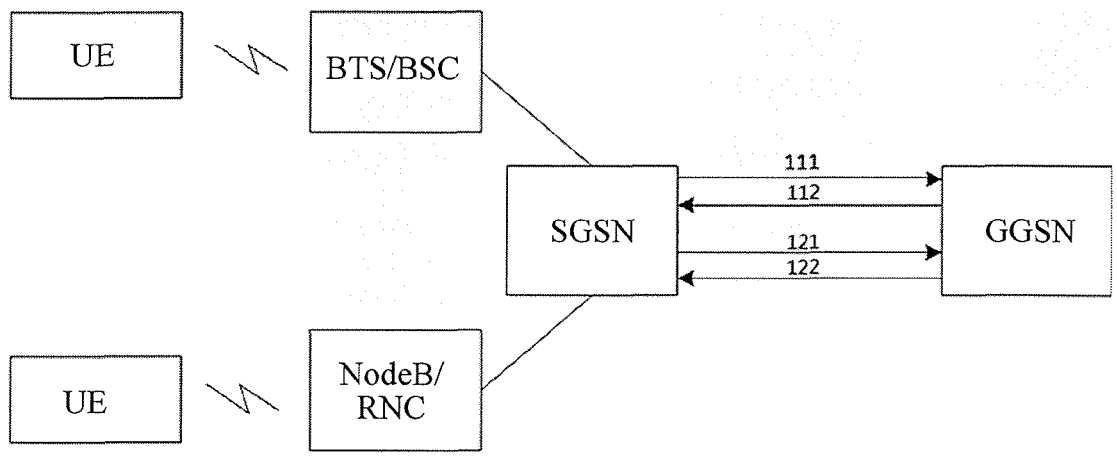
FIG. 3 is a schematic diagram of implementing data transmission, when a 2G or 3G user side initiates create or update of secondary PDP context, by applying a data transmission method according to the present invention.

First, several concepts involved in embodiments of the present invention are explained.

UDP: User Datagram Protocol, user datagram protocol. UDP is a transmission layer protocol, and is generally applied to a packet network, where data of a user is transmitted based on a single UDP packet.

UDP-Lite: User Datagram Protocol Lite, user datagram protocol light. A check range of a checksum field of the UDP-Lite protocol is variable, and the protocol is applicable to a service having a code error rate being greater than a threshold, such as an audio or a video.

GTP: GPRS Tunneling Protocol, GPRS tunneling protocol, which provides a tunnel for transmission of user data and signaling information between GSNs. The GTP protocol is defined for a Gn interface and a Gp interface of a GPRS network, and is a GPRS tunneling protocol. The GTP protocol includes GTP control plane (GTP-C for short) and data transmission (GTP-U for short) protocols, and allows data packets of multiple protocols to be transmitted between SGSNs on the UMTS or GPRS backbone network, and between the SGSN and a gateway GPRS support node (Gateway GPRS Support Node, GGSN for short).

GTPU: user plane of general packet radio service (General Packet Radio Service, GPRS) tunneling protocol (User plane of GPRS Tunneling Protocol, GTPU), capable of implementing user data encapsulation or decapsulation. In order to make the objectives, technical solutions, and advantages of the present invention more comprehensible, the technical solutions according to embodiments of the present invention are clearly and completely described in the following with reference to the accompanying drawings. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

As shown in FIG. 1, it is a schematic flow chart of a first embodiment of a data transmission method according to the present invention. As shown in the drawing, the data transmission method in the first embodiment includes:

Step 101: Receive a create or update message of a PDP (Packet Data Protocol, packet data protocol) context sent by a sending end, where the create or update message carries a quality of service (Quality of Service, QoS for short) parameter of the PDP context.

A receiving end receives the create or update message of a PDP context sent by the sending end. The receiving end may be a network element device, for example, a GGSN, capable of returning a response message according to the received create or update message of the PDP context so as to establish a GTP tunnel. The sending end may be a network element device, for example, an SGSN, capable of sending the create or update message of the PDP context so as to establish the GTP tunnel. Creation of the PDP context includes primary creation of the PDP context and secondary creation of the PDP context.

Step 102: Determine, according to the quality of service parameter, whether user plane tunnel data of a bearer corresponding to the PDP context can be encapsulated through a UDP-Lite protocol, and return, to the sending end, a response message carrying determination result information, so that when receiving the determination result information indicating that encapsulation can be performed through the UPD-Lite protocol, the sending end encapsulates the user plane tunnel data of the bearer corresponding to the PDP context through the UDP-Lite protocol.

Specifically, the receiving end determines, according to the QoS parameter, whether the PDP context is a service having a high packet error resilient, and if yes, determines that the PDP context can be encapsulated through the UDP-Lite protocol. The determining whether the PDP context is a service having a high packet error resilient may specifically be: first, acquiring a first threshold and a second threshold; then, determining, whether a code error resilient in the quality of service parameter of the PDP context is greater than the first threshold and whether a packet loss tolerance in the quality of service parameter of the PDP context is greater than the second threshold, and if both yes, determining that the PDP context is a service having a high packet error resilient, and the user plane tunnel data of the bearer corresponding to the PDP context can be encapsulated through the UDP-Lite protocol; otherwise, determining that the PDP context is not a service having a high packet error resilient, and the user plane tunnel data of the bearer corresponding to the PDP context cannot be encapsulated through the UDP-Lite protocol but can still be encapsulated through a UDP protocol as the prior art, where the first threshold and the second threshold may be set by a person. The first threshold and the second threshold may be acquired by inputting in a manual control manner, and may also be stored in a storage area in advance and acquired from the storage area. The receiving end returns the response message to the sending end, so as to notify whether the receiving end accepts the create or update request of the PDP context sent by the sending end, and if yes, a GTP tunnel is established between the sending end and the receiving end. The sending end and the receiving end may perform information transmission through the GTP tunnel. The determination result information carried in the response message is for notifying the sending end whether a user plane tunnel data of the GTP tunnel corresponding to the PDP context can be encapsulated through the UDP-Lite protocol, so that the sending end responds correspondingly according to the notified result, that is, encapsulates a user plane tunnel data of the service having a high packet error resilient through the UDP-Lite protocol.

This embodiment is a data transmission method proposed based on an existing 2G (second generation mobile phone communications technology) or 3G (third generation mobile phone communications technology) network. In this embodiment, by determining the quality of service parameter of the PDP context, it is determined whether to encapsulate the user plane tunnel data of the bearer corresponding to the PDP context through UDP-Lite. Services, such as audios and videos, having a high packet error resilient can be encapsulated through UDP-Lite by means of the embodiment of the present invention, which, compared with the prior art in which all PDP context are encapsulated through the UDP protocol, can significantly improve the data transmission efficiency.

As shown in FIG. 2, it is a schematic flow chart of a second embodiment of a data transmission method according to the present invention. As shown in the drawing, the data transmission method of the second embodiment includes:

Step 201: Send a create or update message of a PDP context to a receiving end, where the create or update message carries a quality of service parameter.

A sending end sends the create or update message of the PDP context to the receiving end. The sending end may be an SGSN. The receiving end may be a GGSN, like the example shown in FIG. 3.

Step 202: Receive a create or update response message returned by the receiving end, where the response message is returned by the receiving end according to the create or update message, the response message carries determination result information, and the determination result information is a result of determining, by the receiving end according to the quality of service parameter, whether user plane tunnel data of a bearer corresponding to the PDP context can be encapsulated through a UDP-Lite protocol.

Step 203: If the determination result information carried in the response message indicates that encapsulation can be performed through the UP D-Lite protocol, encapsulate the user plane tunnel data of the bearer corresponding to the PDP context through the UDP-Lite protocol.

Specifically, if the determination result information carried in the response message indicates that the encapsulation can be performed through the UPD-Lite protocol, the sending end encapsulates the user plane tunnel data of the bearer corresponding to the PDP context into a data transmission protocol packet (GTPU packet for short) through the UDP-Lite protocol, and sets a checksum coverage (Checksum Coverage) field in a packet header of the GTPU packet to a preset value. It should be noted here that: in the UDP-Lite protocol, whether a data packet needs to be checked or how many bits of the data packet are checked may be controlled by the user. Moreover, in the UDP-Lite protocol, a Length field of the UDP protocol is used to represent the Checksum Coverage of the UDP-Lite protocol, so that when the Checksum Coverage field of the UDP-Lite protocol is equal to the length of a whole UDP data packet (including a UDP header and load), a packet generated by the UDP-Lite is identical to an normal UDP packet. If the Checksum Coverage is 0, it indicates checking the whole data packet encapsulated through the UDP-Lite protocol. If Checksum Coverage>=8, it indicates checking the prior Checksum Coverage bytes of the data packet encapsulated through the UDP-Lite protocol. The Checksum Coverage taking a value other than the foregoing values is illegal. In this embodiment, the preset value may be set to 8, that is, the value of the Checksum Coverage is 8, and therefore, only the prior 8 bytes of the data packet are checked during checksum calculation, that is to say, only the packet header of the GTPU packet encapsulated through the UDP-Lite protocol is checked, and the load of the GTPU packet is not checked, which avoids a problem in the prior art in which it is required to simultaneously check the packet header and load of the data packet encapsulated through the UDP protocol, thereby improving data transmission efficiency.

As shown in FIG. 3, it is a schematic diagram of implementing data transmission, when a 2G or 3G user side initiates secondary create or update of a PDP context, by applying a data transmission method according to the present invention. This application example is the secondary create or update of the PDP context initiated by the user side, and the GGSN determines, according to a QoS parameter, whether to encapsulate, through UDP-Lite, user plane tunnel data of a bearer corresponding to the secondary created PDP context, and notifies an SGSN device through a Create PDP Context Response or an Update PDP Context Response message. A specific implementation process, as the following content, includes the following steps:

The secondary creation of the PDP context initiated by the user side includes:

Step 111: The SGSN sends a Create PDP Context Request message to the GGSN to create a PDP context.

Step 112: The GGSN determines, according to a QoS parameter carried in the Create PDP Context Request message, whether user plane tunnel data of a bearer corresponding to the secondary PDP context to be created can be encapsulated through a UDP-Lite protocol, and returns, to the SGSN, a Create PDP Context Response message carrying a determination result.

If the GGSN determines, according to a QoS parameter carried in the Create PDP Context Response message, the secondary created PDP context to be created is a service having a high packet error resilient, that is, a code error resilient in the quality of service parameter of the secondary created PDP context is greater than a first threshold and a packet loss tolerance in the quality of service parameter of the secondary created PDP context is greater than a second threshold, the user plane tunnel data of the bearer corresponding to the secondary created PDP context can be encapsulated through the UDP-Lite protocol. After the SGSN receives the Create PDP Context Response message returned by the GGSN, a GTP tunnel is established between the SGSN and the GGSN. Information exchanged between the SGSN and the GGSN can be borne in the GTP tunnel for transmission.

Step 113: If the determination result carried in the Create PDP Context Response message indicates that encapsulation can be performed through the UPD-Lite protocol, the SGSN encapsulates a user plane tunnel data of the secondary PDP context through the UDP-Lite protocol.

Specifically, the SGSN encapsulates the user plane tunnel data corresponding to the secondary created PDP context into a GTPU packet through the UDP-Lite protocol, and sets a checksum coverage field in a packet header of the GTPU packet to 8. The sending end SGSN, when sending the GTPU packet to the GGSN, only performs checksum calculation on the packet header of the GTPU packet. The GGSN, after receiving the GTPU packet, only verifies a checksum of the packet header, thereby avoiding verification on the load (Checksum Coverage, checksum coverage) field of the GTPU packet in the prior art.

The update of the PDP context initiated by the user side includes:

Step 121: The SGSN sends an Update PDP Context Request message to the GGSN to update the PDP context.

Step 122: The GGSN updates the PDP context according to the Update PDP Context Request message, and determines, according to a QoS parameter carried in the Update PDP Context Request message, whether user plane tunnel data of a bearer corresponding to the PDP context to be updated can be encapsulated through the UDP-Lite protocol, and feeds back, to the SGSN, an Update PDP Context Response message carrying a determination result.

Likewise, if the GGSN determines, according to the QoS parameter carried in the Create PDP Context Response message, that the secondary PDP context to be updated is a service having a high packet error resilient, the user plane tunnel data of the bearer corresponding to the PDP context can be encapsulated through the UDP-Lite protocol. The determination of the service having a high packet error resilient can be implemented by means of the foregoing determination process. After the SGSN receives the Update PDP Context Response message returned by the GGSN, a GTP tunnel is established between the SGSN and the GGSN. Information exchanged between the SGSN and the GGSN may be borne in the GTP tunnel for transmission.

Step 123: If the determination result carried in the Update PDP Context Response message indicates that encapsulation can be performed through UDP-Lite, the SGSN encapsulates a user plane tunnel data of the secondary PDP context through the UDP-Lite protocol, so that the encapsulated secondary PDP context is borne on the established GTP tunnel for transmission.

The process of the SGSN encapsulating the user plane tunnel data of the bearer corresponding to the PDP context through the UDP-Lite protocol is the same as that described above, and is not repeated herein.

Figure 4:
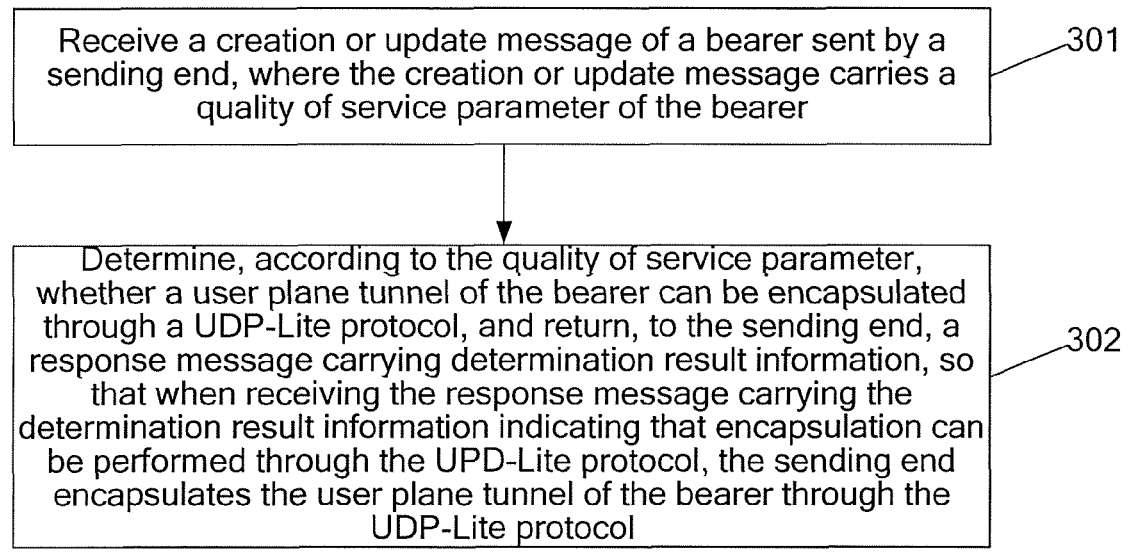
FIG. 4 is a schematic flow chart of a third embodiment of a data transmission method according to the present invention.

As shown in FIG. 4, it is a schematic flow chart of a third embodiment of a data transmission method according to the present invention. As shown in the drawing, the data transmission method of the third embodiment includes:

Step 301: Receive a create or update message of a bearer sent by a sending end, where the create or update message carries a quality of service parameter of the bearer.

This embodiment is a data transmission method implemented based on a 4G (fourth generation mobile phone communications technology) network, for example, a networking manner that an SGSN accesses an EPC network through an S4 interface (S4 SGSN networking for short) or an EPC network. Specifically, a receiving end receives the create or update message of the bearer sent by the sending end. The receiving end may be a network element device capable of sending the create or update message of the bearer to establish a GTP tunnel, for example, an SGSN; or a network element device capable of forwarding the received create or update message of the bearer, for example, an S-GW. The receiving end may specifically be a PDN (Public Data Network, public data network) gateway (P-GW for short). The bearer includes a dedicated bearer and a default bearer.

Step 302: Determine, according to the quality of service parameter, whether a user plane tunnel data of the bearer can be encapsulated through a UDP-Lite protocol, and return, to the sending end, a response message carrying determination result information, so that when receiving the response message carrying the determination result information indicating that encapsulation can be performed through the UPD-Lite protocol, the sending end encapsulates the user plane tunnel data of the bearer through the UDP-Lite protocol.

Specifically, the receiving end determines, according to the QoS parameter, whether the bearer is a service having a high packet error resilient, and if yes, determines that the bearer can be encapsulated through the UDP-Lite protocol. The determining whether the bearer is a service having a high packet error resilient may specifically include: acquiring a first threshold and a second threshold, determining, whether a code error resilient in the quality of service parameter of the bearer is greater than the first threshold and whether a packet loss tolerance in the quality of service parameter of the bearer is greater than the second threshold, and if both yes, determining that the bearer is a service having a high packet error resilient, and the user plane tunnel data of the bearer can be encapsulated through the UDP-Lite protocol; otherwise, determining that the bearer is not a service having a high packet error resilient, and the user plane tunnel data of the bearer cannot be encapsulated through the UDP-Lite protocol, but can still be encapsulated through the UDP protocol in the prior art. The first threshold and the second threshold may be set by a person. The receiving end returns the response message to the sending end, so as to notify whether the receiving end accepts the bearer create or update request sent by the sending end, and if yes, a GTP tunnel is established between the sending end and the receiving end. The sending end and the receiving end may perform information transmission through the GTP tunnel. The determination result information carried in the response message aims to notify the sending end whether the user plane tunnel data of the bearer can be encapsulated through the UDP-Lite protocol, so that the sending end responds correspondingly according to the notified result, that is, encapsulates the user plane tunnel of the service having a high packet error resilient through the UDP-Lite protocol.

Figure 5:
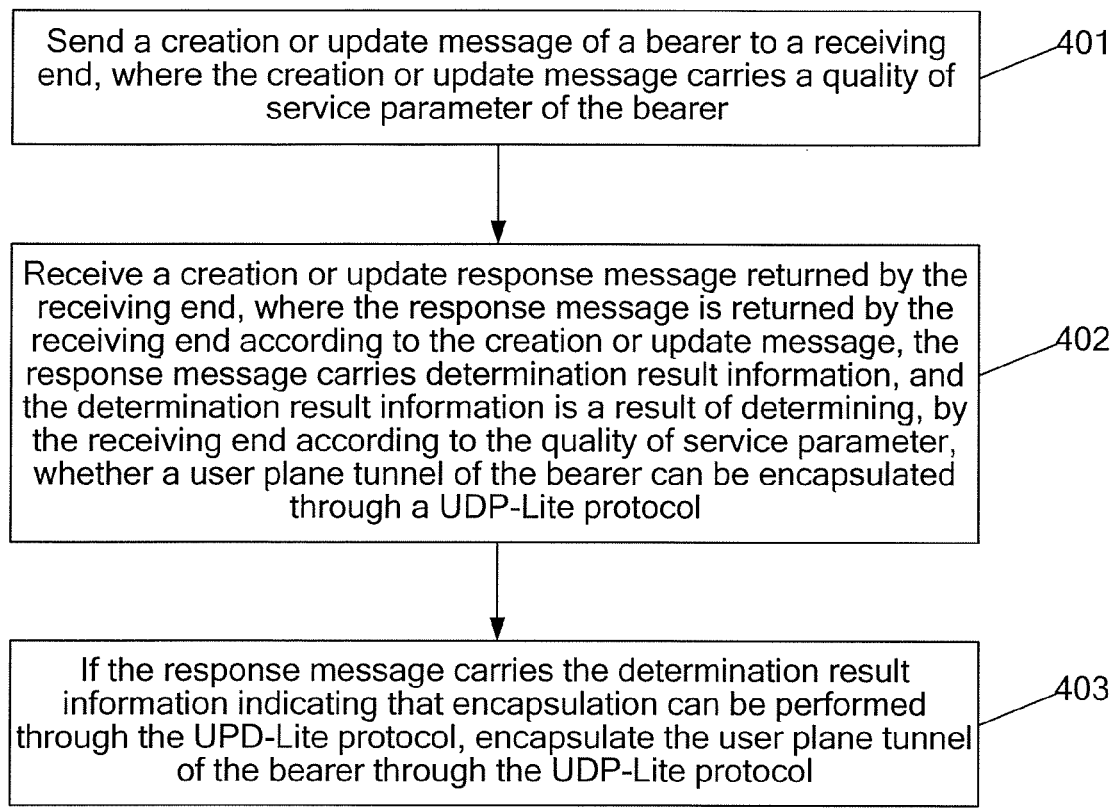
FIG. 5 is a schematic flow chart of a fourth embodiment of a data transmission method according to the present invention.

As shown in FIG. 5, it is a schematic flow chart of a fourth embodiment of a data transmission method according to the present invention. As shown in the drawing, the data transmission method of the fourth embodiment includes:

Step 401: Send a create or update message of a bearer to a receiving end, where the create or update message carries a quality of service parameter of the bearer.

A sending end sends the create or update message of the bearer to the receiving end. The bearer includes a dedicated bearer and a default bearer. The receiving end may be a network element device capable of sending the create or update message of the bearer to establish a GTP tunnel, for example, an SGSN; or a network element device capable of forwarding the received create or update message of the bearer, for example, an S-GW. The receiving end may specifically be a P-GW.

Step 402: Receive a create or update response message returned by the receiving end, where the response message is returned by the receiving end according to the create or update message, the response message carries determination result information, and the determination result information is a result of determining, by the receiving end according to the quality of service parameter, whether a user plane tunnel data of the bearer can be encapsulated through a UDP-Lite protocol.

Step 403: If the response message carries the determination result information indicating that encapsulation can be performed through the UPD-Lite protocol, encapsulate the user plane tunnel data of the bearer through the UDP-Lite protocol.

Specifically, if the determination result information carried in the response message indicates that the encapsulation can be performed through the UPD-Lite protocol, the sending end encapsulates the user plane tunnel data of the bearer into a GTPU packet through the UDP-Lite protocol, and sets a checksum coverage (Checksum Coverage) field in a packet header of the GTPU packet to a preset value. For the selection of the preset value, reference may be made to related content involved in the foregoing embodiment, which is not repeated herein.

The third embodiment and the fourth embodiment are data transmission methods proposed based on that a user side in existing 4G initiates a create or update message of a bearer to establish a GTP tunnel. In the embodiments, by determining the quality of service parameter of the bearer, it is determined whether to encapsulate the bearer through UDP-Lite. For some bearers that can be encapsulated through UDP-Lite, especially services having a high packet error resilient, such as audios and videos, UDP-Lite encapsulation can be implemented through the technical solutions provided in the present invention, which can significantly improve data transmission efficiency as compared with the prior art in which all bearers are encapsulated through the UDP protocol.

Figure 6:
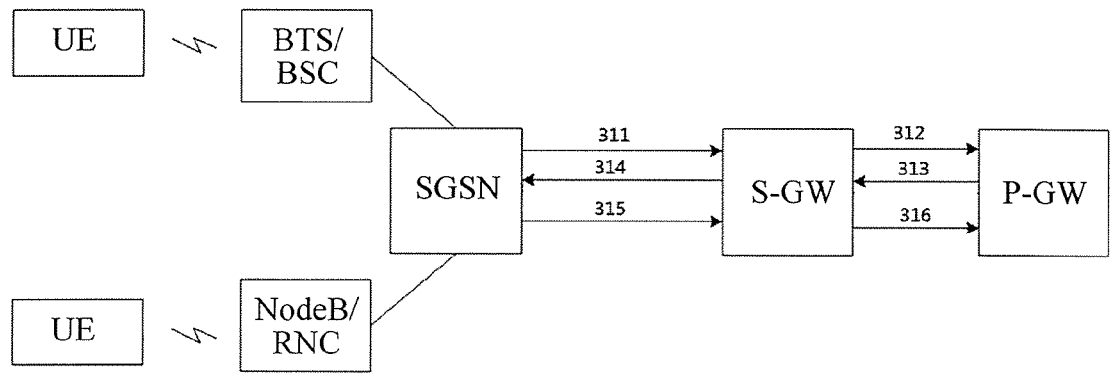
FIG. 6 is a schematic diagram of implementing data transmission, when a user side of S4 SGSN networking initiates creation of a dedicated bearer, by applying a data transmission method according to the present invention.
Figure 7:
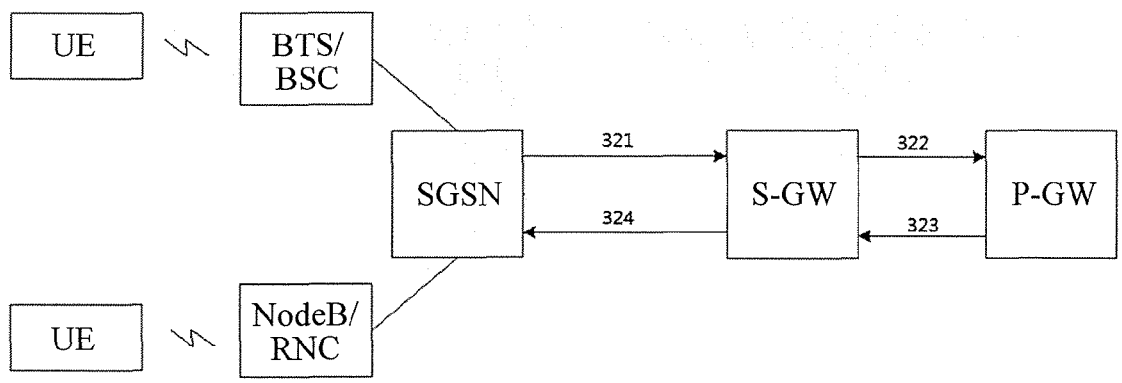
FIG. 7 is a schematic diagram of implementing data transmission, when a user side of S4 SGSN networking initiates update of a dedicated bearer, by applying a data transmission method according to the present invention.

As shown in FIG. 6 and FIG. 7, they are schematic diagrams of implementing data transmission, when a user side of S4 SGSN networking initiates create or update of a bearer, by applying a data transmission method according to the present invention. As shown in the drawing, for the create or update of the dedicated bearer initiated by the user side of the S4 SGSN networking, a P-GW determines, according to a QoS parameter, whether to encapsulate the dedicated bearer through UDP-Lite, and notifies an S-GW and an SGSN device through a Create Bearer Request or Update Bearer Request message. A specific implementation process is as the following content:

As shown in FIG. 6, it is a schematic diagram of implementing data transmission when a user side of S4 SGSN networking initiates creation of a dedicated bearer, which includes:

Step 311: An SGSN initiates a Bearer Resource Command message to request creation of a dedicated bearer.

Step 312: An S-GW forwards, to a P-GW, the Bearer Resource Command message initiated by and received from the SGSN.

Step 313: The P-GW determines, according to a QoS parameter carried in the Bearer Resource Command message, whether a user plane tunnel data of a dedicated bearer to be created can be encapsulated through a UDP-Lite protocol, and returning, to the S-GW, a Create Bearer Request message carrying a determination result.

Step 314: The S-GW determines, according to the determination result carried in the Create Bearer Request message, whether to encapsulate the dedicated bearer through the UDP-Lite protocol, and forwards the received Create Bearer Request message to the SGSN at the same time. If the determination result carried in the Create Bearer Request message indicates that encapsulation can be performed through the UPD-Lite protocol, the S-GW encapsulates the user plane tunnel data of the dedicated bearer through the UDP-Lite protocol.

Step 315: The SGSN determines, according to the determination result carried in the Create Bearer Request message, whether to encapsulate the user plane tunnel data of the dedicated bearer through the UDP-Lite protocol, and returns a create dedicated bearer response message to the S-GW. If the determination result carried in the Create Bearer Request message indicates that encapsulation can be performed through the UPD-Lite protocol, the SGSN encapsulates the user plane tunnel data of the dedicated bearer through the UDP-Lite protocol.

It should be noted that: in a DT (direct tunnel, direct tunnel) mode, the SGSN further needs to forward the Create Bearer Request message to a radio network controller (RNC for short). The RNC determines, according to the determination result carried in the Create Bearer Request message, whether to encapsulate the user plane tunnel data of the dedicated bearer through the UDP-Lite protocol. If the determination result carried in the Create Bearer Request message indicates that the encapsulation can be performed through the UPD-Lite protocol, the RNC encapsulates the user plane tunnel data of the dedicated bearer through the UDP-Lite protocol.

Step 316: The S-GW, after receiving the create dedicated bearer response message returned by the SGSN, returns the create dedicated bearer response message to the P-GW as well.

As shown in FIG. 7, it is a schematic diagram of implementing data transmission when a user side of S4 SGSN networking initiates update of a dedicated bearer. The update of the dedicated bearer initiated by the user side of the S4 SGSN networking includes:

Step 321: An SGSN initiates a Modify Bearer Command message to request modification of a dedicated bearer.

Step 322: An S-GW forwards, to a P-GW, the Modify Bearer Command message initiated by and received from the SGSN.

Step 323: The P-GW determines, according to a QoS parameter carried in the received Modify Bearer Command message, whether the dedicated bearer to be updated can be encapsulated through the UDP-Lite protocol, and returns, to the S-GW, an Update Bearer Request message carrying a determination result.

Step 324: The S-GW determines, according to the determination result carried in the Update Bearer Request message, whether to encapsulate the dedicated bearer through the UDP-Lite protocol, and forwards the received Update Bearer Request message to the SGSN. If the determination result carried in the Update Bearer Request message indicates that encapsulation can be performed through the UPD-Lite protocol, the S-GW encapsulates the user plane tunnel data of the dedicated bearer through the UDP-Lite protocol.

Step 325: The SGSN determines, according to the determination result carried in the Update Bearer Request message, whether to encapsulate the user plane tunnel data of the dedicated bearer through the UDP-Lite protocol. If the determination result carried in the Update Bearer Request message indicates that encapsulation can be performed through the UPD-Lite protocol, the SGSN encapsulates the user plane tunnel data of the dedicated bearer through the UDP-Lite protocol.

It should be noted that: in a DT mode, the SGSN further needs to forward the Update Bearer Request message to an RNC. The RNC determines, according to the determination result carried in the Update Bearer Request message, whether to encapsulate the dedicated bearer through the UDP-Lite protocol. If the determination result carried in the Update Bearer Request message indicates that the encapsulation can be performed through the UPD-Lite protocol, the RNC encapsulates the user plane tunnel data of the dedicated bearer through the UDP-Lite protocol.

Step 326: The S-GW, after receiving a create dedicated bearer response message returned by the SGSN, returns the create dedicated bearer response message to the P-GW as well.

Figure 8:
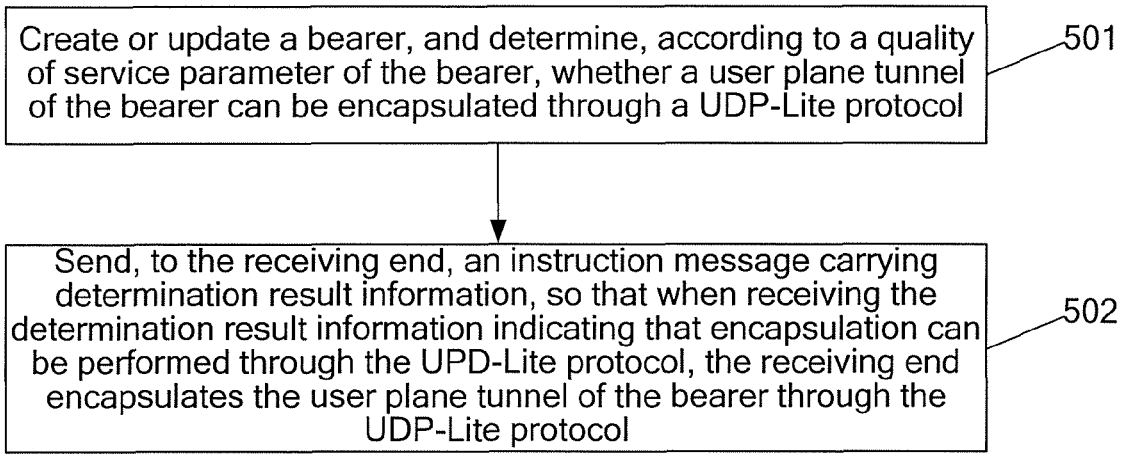
FIG. 8 is a schematic flow chart of a fifth embodiment of a data transmission method according to the present invention.

As shown in FIG. 8, it is a schematic flow chart of a fifth embodiment of a data transmission method according to the present invention. As shown in the drawing, the data transmission method of the fifth embodiment is also a data transmission method implemented based on an existing 4G network, for example, S4 SGSN networking or EPC networking, and includes:

Step 501: Create or update a bearer, and determine, according to a quality of service parameter of the bearer, whether a user plane tunnel data of the bearer can be encapsulated through a UDP-Lite protocol.

Specifically, a sending end initiates the create or update of the bearer. The sending end may specifically be a P-GW. The bearer includes a dedicated bearer and a default bearer. The P-GW determines, whether a code error resilient in the quality of service parameter of the bearer is greater than a first threshold and whether a packet loss tolerance in the quality of service parameter of the bearer is greater than a second threshold, and if both yes, determines that the user plane tunnel data of the bearer can be encapsulated through the UDP-Lite protocol; otherwise, determines that the user plane tunnel data of the bearer cannot be encapsulated through the UDP-Lite protocol, but can still be encapsulated through the UDP protocol in the prior art. The first threshold and the second threshold may be set by a person.

Step 502: Send, to the receiving end, an instruction information carrying determination result information, so that when receiving the determination result information indicating that encapsulation can be performed through the UPD-Lite protocol, the receiving end encapsulates the user plane tunnel data of the bearer through the UDP-Lite protocol.

Specifically, the sending end sends, to the receiving end, the instruction information carrying determination result information. In the S4 SGSN networking, the receiving end may be an S-GW or SGSN. In the EPC networking, the receiving end may be an S-GW or eNodeB.

Figure 9:
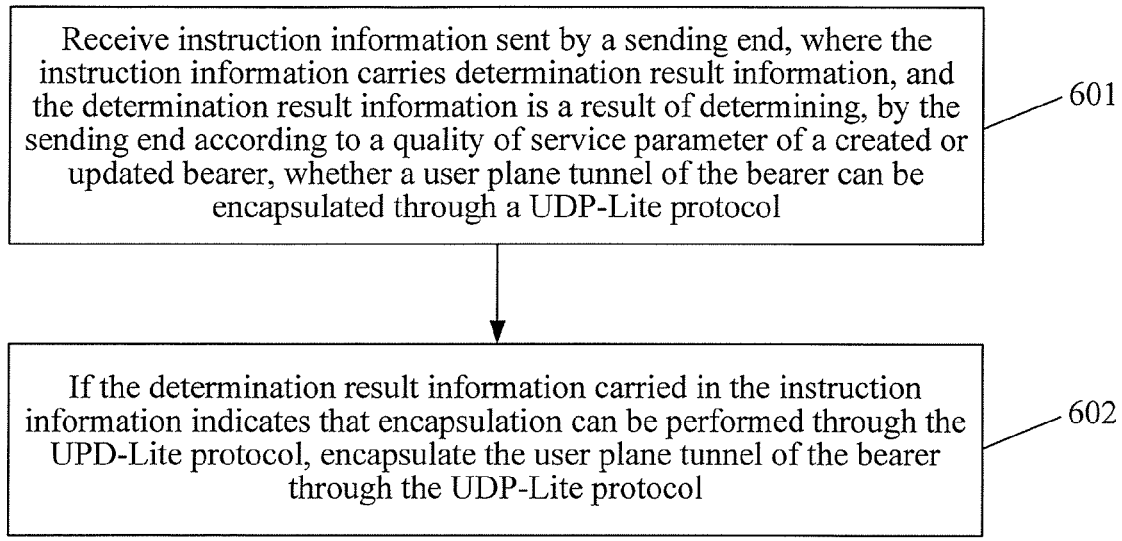
FIG. 9 is a schematic flow chart of a sixth embodiment of a data transmission method according to the present invention.

As shown in FIG. 9, it is a schematic flow chart of a sixth embodiment of a data transmission method according to the present invention. As shown in the drawing, the data transmission method of the sixth embodiment includes:

Step 601: Receive instruction information sent by a sending end, where the instruction information carries determination result information, and the determination result information is a result of determining, by the sending end according to a quality of service parameter of a created or updated bearer, whether a user plane tunnel data of the bearer can be encapsulated through a UDP-Lite protocol.

Specifically, a receiving end receives the instruction information sent by the sending end.

Step 602: If the determination result information carried in the instruction information indicates that encapsulation can be performed through the UPD-Lite protocol, encapsulate the user plane tunnel data of the bearer through the UDP-Lite protocol.

Specifically, the receiving end encapsulates the user plane tunnel data of the bearer into a data transmission protocol packet through the UDP-Lite protocol, and sets a checksum coverage field in a packet header of the data transmission protocol packet to a preset value.

Figure 10:
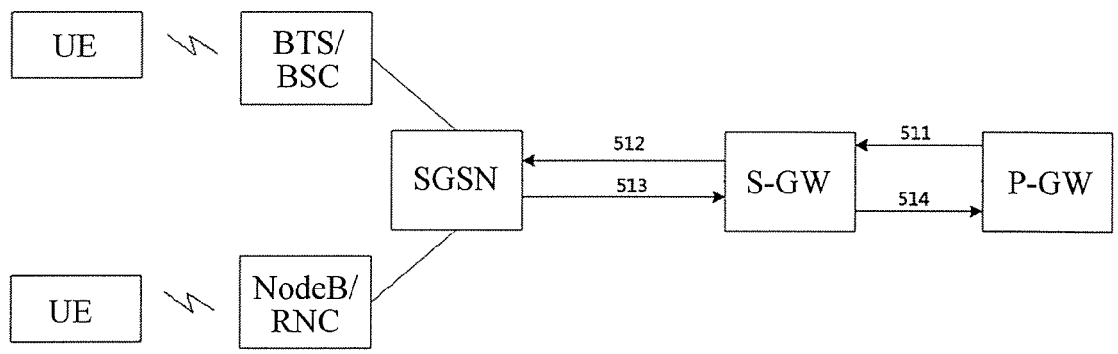
FIG. 10 is a schematic diagram of implementing data transmission, when a network side of S4 SGSN networking initiates creation of a dedicated bearer, by applying a data transmission method according to the present invention.
Figure 11:
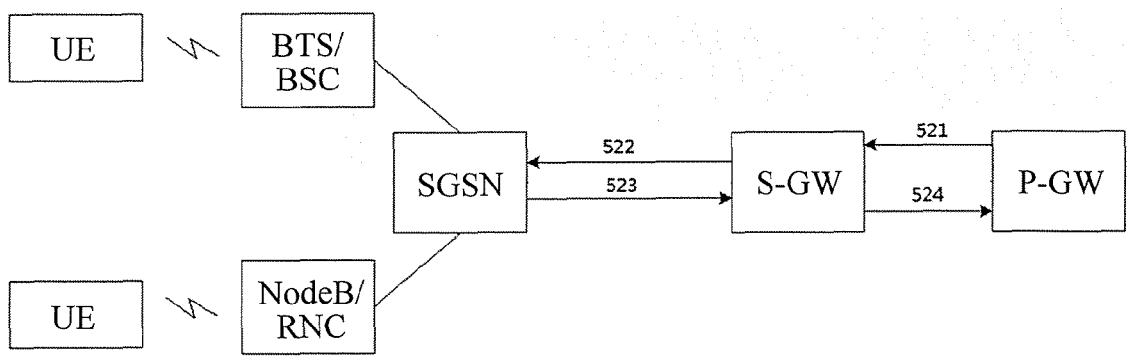
FIG. 11 is a schematic diagram of implementing data transmission, when a network side of S4 SGSN networking initiates update of a dedicated bearer, by applying a data transmission method according to the present invention.

The fifth embodiment and the sixth embodiment are data transmission methods proposed based on that a network side in existing 4G initiates create or update of a bearer to establish a GTP tunnel. In the embodiments, by determining the quality of service parameter of the bearer, it is determined whether to encapsulate the bearer through UDP-Lite. For some bearers that can be encapsulated through UDP-Lite, especially services having a high packet error resilient, such as audios and videos, UDP-Lite encapsulation can be implemented through the technical solutions provided in the present invention, which can significantly improve data transmission efficiency as compared with the prior art in which all bearers are encapsulated through the UDP protocol. As shown in FIG. 10 and FIG. 11, they are schematic diagrams of implementing data transmission, when a network side of S4 SGSN networking initiates create or update of a bearer, by applying a data transmission method according to the present invention. As shown in the drawing, for the create or update of the dedicated bearer initiated by the network side of the S4 SGSN networking, a P-GW determines, according to a QoS parameter of the dedicated bearer, whether to encapsulate the dedicated bearer through the UDP-Lite protocol, and an S-GW and an SGSN device are notified through a Create Bearer Request or Update Bearer Request message. The specific implementation is described in the following.

As shown in FIG. 10, it is a schematic diagram of implementing data transmission when a network side of S4 SGSN networking initiates creation of a dedicated bearer, which includes:

Step 511: When creating a dedicated bearer, a P-GW determines, according to a QoS parameter of the dedicated bearer, whether a user plane tunnel data of the dedicated bearer can be encapsulated through a UDP-Lite protocol, and returns, to an S-GW, a Create Bearer Request message carrying a determination result.

Step 512: The S-GW determines, according to the determination result carried in the Create Bearer Request message, whether to encapsulate the user plane tunnel data of the dedicated bearer through the UDP-Lite protocol, and forwards the received Create Bearer Request message to the SGSN. If the determination result carried in the Create Bearer Request message indicates that encapsulation can be performed through the UPD-Lite protocol, the S-GW encapsulates the user plane tunnel data of the dedicated bearer through the UDP-Lite protocol.

Step 513: The SGSN determines, according to the determination result carried in the Create Bearer Request message, whether to encapsulate the user plane tunnel data of the dedicated bearer through the UDP-Lite protocol, and returns a create dedicated bearer response message to the S-GW. If the determination result carried in the Create Bearer Request message indicates that encapsulation can be performed through the UPD-Lite protocol, the SGSN encapsulates the user plane tunnel data of the dedicated bearer through the UDP-Lite protocol.

It should be noted that: in a DT mode, the SGSN further needs to forward the Create Bearer Request message to an RNC. The RNC determines, according to the determination result carried in the Create Bearer Request message, whether to encapsulate the dedicated bearer through the UDP-Lite protocol. If the determination result carried in the Create Bearer Request message indicates that encapsulation can be performed through the UPD-Lite protocol, the RNC encapsulates the user plane tunnel data of the dedicated bearer through the UDP-Lite protocol.

Step 514: The S-GW, after receiving the create dedicated bearer response message returned by the SGSN, returns the create dedicated bearer response message to the P-GW as well.

As shown in FIG. 11, it is a schematic diagram of implementing data transmission when a network side of S4 SGSN networking initiates update of a dedicated bearer, which includes:

Step 521: When updating a dedicated bearer, a P-GW determines, according to a QoS parameter of the dedicated bearer, whether a user plane tunnel data of the dedicated bearer can be encapsulated through a UDP-Lite protocol, and returns, to an S-GW, a Update Bearer Request message carrying a determination result.

Step 522: The S-GW determines, according to the determination result carried in the Update Bearer Request message, whether to encapsulate the user plane tunnel data of the dedicated bearer through the UDP-Lite protocol, and forwards the received Update Bearer Request message to the SGSN. If the determination result carried in the Update Bearer Request message indicates that encapsulation can be performed through the UPD-Lite protocol, the S-GW encapsulates the user plane tunnel data of the dedicated bearer through the UDP-Lite protocol.

Step 523: The SGSN determines, according to the determination result carried in the Update Bearer Request message, whether to encapsulate the user plane tunnel data of the dedicated bearer through the UDP-Lite protocol, and returns a create dedicated bearer response message to the S-GW. If the determination result carried in the Update Bearer Request message indicates that encapsulation can be performed through the UPD-Lite protocol, the SGSN encapsulates the user plane tunnel data of the dedicated bearer through the UDP-Lite protocol.

It should be noted that: in a DT mode, the SGSN further needs to forward the Update Bearer Request message to an RNC. The RNC determines, according to the determination result carried in the Update Bearer Request message, whether to encapsulate the user plane tunnel data of the dedicated bearer through the UDP-Lite protocol. If the determination result carried in the Update Bearer Request message indicates that encapsulation can be performed through the UPD-Lite protocol, the RNC encapsulates the user plane tunnel data of the dedicated bearer through the UDP-Lite protocol.

Step 524: The S-GW, after receiving a dedicated bearer update response message returned by the SGSN, returns the dedicated bearer update response message to the P-GW as well.

Figure 12:
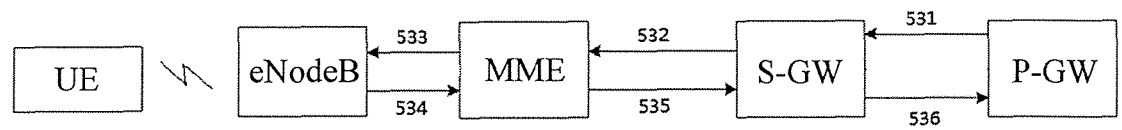
FIG. 12 is a schematic diagram of implementing data transmission, when an EPC user side initiates creation of a dedicated bearer, by applying a data transmission method according to the present invention.
Figure 13:
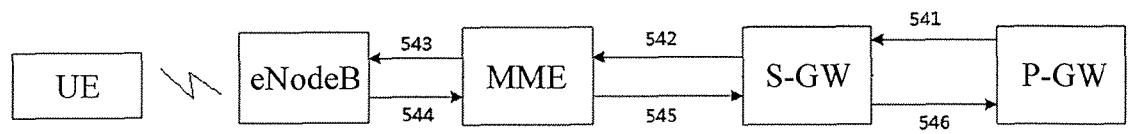
FIG. 13 is a schematic diagram of implementing data transmission, when an EPC user side initiates update of a dedicated bearer, by applying a data transmission method according to the present invention.

As shown in FIG. 12 and FIG. 13, they are schematic diagrams of implementing data transmission, when a network side of EPC networking initiates create or update of a bearer, by applying a data transmission method according to the present invention. As shown in the drawing, for the dedicated bearer create or update initiated by the network side of the EPC networking, a P-GW determines, according to a QoS parameter of the dedicated bearer, whether to encapsulate a GTPU packet through a UDP-Lite, and notifies an S-GW, an MME and an eNodeB through a Create Bearer Request or Update Bearer Request message. The specific implementation is described in the following.

As shown in FIG. 12, it is a schematic diagram of data transmission when an EPC user side initiates the dedicated bearer creation. For the dedicated bearer creation initiated by the network side, the data transmission method includes:

Step 531: When creating a dedicated bearer, a P-GW determines, according to a QoS parameter of the dedicated bearer, whether the dedicated bearer can be encapsulated through a UDP-Lite protocol, and returns, to an S-GW, a Create Bearer Request message carrying a determination result.

Step 532: The S-GW processes the dedicated bearer creation, determines, according to the determination result carried in the Create Bearer Request message, whether to encapsulate the dedicated bearer through the UDP-Lite protocol, and forwards the received Create Bearer Request message to an MME. If the determination result carried in the Create Bearer Request message indicates that encapsulation can be performed through the UPD-Lite protocol, the S-GW encapsulates the user plane tunnel data of the dedicated bearer through the UDP-Lite protocol.

Step 533: The MME processes the dedicated bearer creation, and forwards the received Create Bearer Request message to an eNodeB.

Step 534: The eNodeB processes the dedicated bearer creation, determines, according to the determination result carried in the Create Bearer Request message, whether to encapsulate the user plane tunnel data of the dedicated bearer through the UDP-Lite protocol, and returns a create dedicated bearer response message to the MME. If the determination result carried in the Create Bearer Request message indicates that encapsulation can be performed through the UPD-Lite protocol, the eNodeB encapsulates the user plane tunnel data of the dedicated bearer through the UDP-Lite protocol.

Step 535: The MME, after receiving the create dedicated bearer response message returned by the eNodeB, returns the create dedicated bearer response message to the S-GW as well.

Step 536: The S-GW, after receiving the create dedicated bearer response message returned by the MME, returns the create dedicated bearer response message to the P-GW as well.

As shown in FIG. 13, it is a schematic diagram of data transmission when an EPC user side initiates the dedicated bearer update. For the dedicated bearer update initiated by the network side, the data transmission method includes:

Step 541: When updating a dedicated bearer, a P-GW determines, according to a QoS parameter of the dedicated bearer, whether the dedicated bearer can be encapsulated through a UDP-Lite protocol, and returns, to an S-GW, an Update Bearer Request message carrying a determination result.

Step 542: The S-GW processes the dedicated bearer creation, determines, according to the determination result carried in the Update Bearer Request message, whether to encapsulate the dedicated bearer through the UDP-Lite protocol, and forwards the received Update Bearer Request message to an MME. If the determination result carried in the Update Bearer Request message indicates that encapsulation can be performed through the UPD-Lite protocol, the S-GW encapsulates the user plane tunnel data of the dedicated bearer through the UDP-Lite protocol.

Step 543: The MME processes the dedicated bearer update, and forwards the received Update Bearer Request message to an eNodeB.

Step 544: The eNodeB processes the dedicated bearer update, determines, according to the determination result carried in the Update Bearer Request message, whether to encapsulate the dedicated bearer through the UDP-Lite protocol, and returns a update dedicated bearer response message to the MME. If the determination result carried in the Update Bearer Request message indicates that encapsulation can be performed through the UPD-Lite protocol, the eNodeB encapsulates the user plane tunnel data of the dedicated bearer through the UDP-Lite protocol.

Step 545: The MME, after receiving the update dedicated bearer response message returned by the eNodeB, returns the create dedicated bearer response message to the S-GW as well.

Step 546: The S-GW, after receiving the update dedicated bearer response message returned by the MME, returns the create dedicated bearer response message to the P-GW as well.

Figure 14:
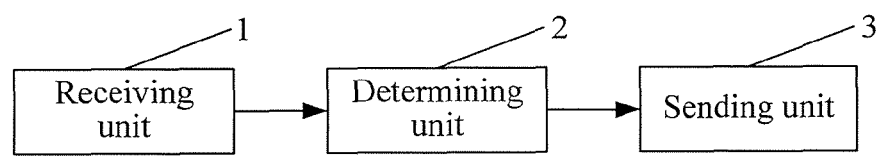
FIG. 14 is a schematic structural diagram of a first embodiment of a network element device according to the present invention.

As shown in FIG. 14, it is a schematic structural diagram of a first embodiment of a network element device according to the present invention. As shown in the drawing, the network element device includes: a receiving unit 1, a determining unit 2, and a sending unit 3. The receiving unit 1 is configured to receive a create or update message of a PDP context sent by a sending end, where the create or update message carries a quality of service parameter. The determining unit 2 is configured to determine, according to the quality of service parameter, whether user plane tunnel data of a bearer corresponding to the PDP context can be encapsulated through a UDP-Lite protocol, so as to obtain a determination result. The sending unit 3 is configured to return, to the sending end, a response message carrying the determination result information, so that when receiving the determination result information indicating that encapsulation can be performed through the UPD-Lite protocol, the sending end encapsulates the user plane tunnel data of the bearer corresponding to the PDP context through the UDP-Lite protocol. In this embodiment, the network element device may be a GGSN.

Further, the determining unit in the embodiment is specifically configured to acquire a first threshold and a second threshold, determine, whether a code error resilient in the quality of service parameter of the PDP context is greater than the first threshold and whether a packet loss tolerance in the quality of service parameter of the PDP context is greater than the second threshold, and if both yes, obtain a determination result that the user plane tunnel data of the bearer corresponding to the PDP context can be encapsulated through the UDP-Lite protocol; otherwise, obtain a determination result that the user plane tunnel data of the bearer corresponding to the PDP context cannot be encapsulated through the UDP-Lite protocol.

This embodiment is a network element device proposed based on an existing 2G or 3G network. In this embodiment, the network element device determines the quality of service parameter of the PDP context, so as to determine whether the user plane tunnel data of the bearer corresponding to the PDP context can be encapsulated through UDP-Lite. For some PDP contexts that can be encapsulated through UDP-Lite, especially services having a high packet error resilient such as audios and videos, this embodiment may output the determination result of whether the PDP context can be encapsulated through UDP-Lite, so that the network element device of the receiving end responds correspondingly according to the determination result, which can significantly improve data transmission efficiency as compared with the prior art in which all PDP contexts are encapsulated through the UDP protocol.

Figure 15:
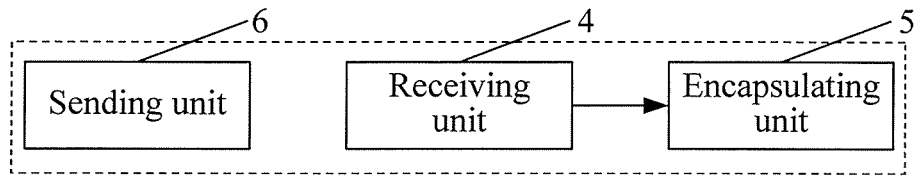
FIG. 15 is a schematic structural diagram of a second embodiment of a network element device according to the present invention.

As shown in FIG. 15, it is a schematic structural diagram of a second embodiment of a network element device according to the present invention. As shown in the drawing, the network element device includes: a sending unit 6, a receiving unit 4, and an encapsulating unit 5. The sending unit 6 is configured to send a create or update message of a PDP context to a receiving end, where the create or update message carries a quality of service parameter of the PDP context. The receiving unit 4 is configured to receive a create or update response message returned by the receiving end, where the response message is returned by the receiving end according to the create or update message, the response message carries determination result information, and the determination result information is a result of determining, by the receiving end according to the quality of service parameter, whether to encapsulate user plane tunnel data of a bearer corresponding to the PDP context can be encapsulated through a UDP-Lite protocol. The encapsulating unit 5 is configured to, when the response message carries the determination result information indicating that encapsulation can be performed through the UPD-Lite protocol, encapsulate the user plane tunnel data of the bearer corresponding to the PDP context through the UDP-Lite protocol.

The network element device described in the second embodiment may specifically be an SGSN. In this embodiment, the encapsulating unit may be specifically configured to encapsulate the user plane tunnel data of the bearer corresponding to the PDP context into a data transmission protocol packet through the UDP-Lite protocol, and set a checksum coverage field in a packet header of the data transmission protocol packet to a preset value.

The second embodiment is a network element device proposed based on an existing 2G or 3G network. The network element device in this embodiment determines, according to a determination result carried by received response information, whether to encapsulate the user plane tunnel data of the bearer corresponding to the PDP context through UDP-Lite. For some PDP context that can be encapsulated through UDP-Lite, especially services having a high packet error resilient such as audios and videos, the network element device of this embodiment may implement the UDP-Lite protocol encapsulation, which can significantly improve data transmission efficiency as compared with the prior art in which all PDP context are encapsulated through the UDP protocol.

Figure 16:
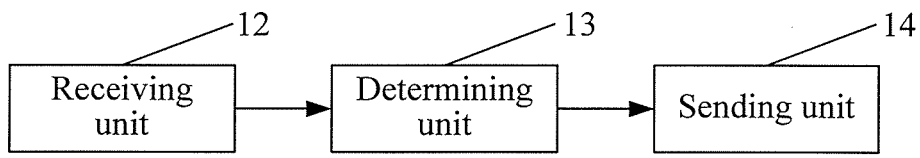
FIG. 16 is a schematic structural diagram of a third embodiment of a network element device according to the present invention.

As shown in FIG. 16, it is a schematic structural diagram of a third embodiment of a network element device according to the present invention. As shown in the drawing, the network element device includes: a receiving unit 12, a determining unit 13, and a sending unit 14. The receiving unit 12 is configured to receive a create or update message of a bearer sent by a sending end, where the create or update message carries a quality of service parameter of the bearer. The determining unit 13 is configured to determine, according to the quality of service parameter, whether a user plane tunnel data of the bearer can be encapsulated through a UDP-Lite protocol, so as to obtain a determination result. The sending unit 14 is configured to return, to the sending end, a response message carrying the determination result information, so that when receiving the response message carrying the determination result information indicating that encapsulation can be performed through the UPD-Lite protocol, the sending end encapsulates the user plane tunnel data of the bearer through the UDP-Lite protocol. In this embodiment, the network element device may be a P-GW.

Further, the determining unit in the foregoing embodiment is specifically configured to acquire a first threshold and a second threshold, determine, whether a code error resilient in the quality of service parameter of the bearer is greater than the first threshold and whether a packet loss tolerance in the quality of service parameter of the bearer is greater than the second threshold, and if both yes, obtain a determination result that the user plane tunnel data of the bearer can be encapsulated through the UDP-Lite protocol; otherwise, obtain a determination result that of the user plane tunnel data of the bearer cannot be encapsulated through the UDP-Lite protocol.

The third embodiment is a network element device proposed based on an existing 4G network, for example, S4 SGSN networking or EPC networking. The network element device in this embodiment determines the quality of service parameter of the bearer, so as to determine whether to encapsulate the user plane tunnel data of the bearer through UDP-Lite. For some bearers that can be encapsulated through UDP-Lite, especially services having a high packet error resilient such as audios and videos, this embodiment may output the determination result of whether the bearer can be encapsulated through UDP-Lite, so that the network element device of the receiving end responds correspondingly according to the determination result, which can significantly improve data transmission efficiency as compared with the prior art in which all bearers are encapsulated through the UDP protocol.

Figure 17:
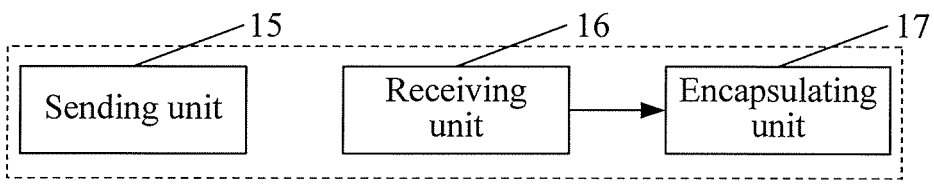
FIG. 17 is a schematic structural diagram of a fourth embodiment of a network element device according to the present invention.

As shown in FIG. 17, it is a schematic structural diagram of a fourth embodiment of a network element device according to the present invention. The network element device includes: a sending unit 15, a receiving unit 16, and an encapsulating unit 17. The sending unit 15 is configured to send a create or update message of a bearer to a receiving end, where the create or update message carries a quality of service parameter of the bearer. The receiving unit 16 is configured to receive a create or update response message returned by the receiving end, where the response message is returned by the receiving end according to the create or update message, the response message carries determination result information, and the determination result information is a result of determining, by the receiving end according to the quality of service parameter, whether a user plane tunnel data of the bearer can be encapsulated through a UDP-Lite protocol. The encapsulating unit 17 is configured to, when the response message carries determination result information indicating that encapsulation can be performed through the UPD-Lite protocol, encapsulate the user plane tunnel data of the bearer through the UDP-Lite protocol.

Further, the encapsulating unit is specifically configured to, when the response message carries the determination result information indicating that encapsulation can be performed through the UPD-Lite protocol, encapsulate the user plane tunnel data of the bearer into a data transmission protocol packet through the UDP-Lite protocol, and set a checksum coverage field in a packet header of the data transmission protocol packet to a preset value.

The fourth embodiment is a network element device proposed based on an existing 4G network, for example, S4 SGSN networking or EPC networking. The network element device in this embodiment determines, according to a determination result carried in received response information, whether to encapsulate the user plane tunnel data of the bearer through UDP-Lite. For some bearers that can be encapsulated through UDP-Lite, especially services having a high packet error resilient such as audios and videos, the network element device of this embodiment may implement the UDP-Lite encapsulation, which can significantly improve data transmission efficiency as compared with the prior art in which all bearers are encapsulated through the UDP protocol.

Figure 18:
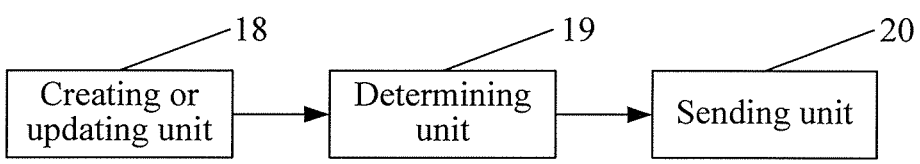
FIG. 18 is a schematic structural diagram of a fifth embodiment of a network element device according to the present invention.

As shown in FIG. 18, it is a schematic structural diagram of a fifth embodiment of a network element device according to the present invention. As shown in the drawing, the network element device includes a creating or updating unit 18, a determining unit 19, or a sending unit 20. The creating or updating unit 18 is configured to create or update a bearer. The determining unit 19 is configured to determine, according to a quality of service parameter of the bearer, whether a user plane tunnel data of the bearer can be encapsulated through a UDP-Lite protocol, so as to obtain a determination result. The sending unit 20 is configured to send, to the receiving end, an instruction information carrying determination result information, so that when receiving the determination result information indicating that encapsulation can be performed through the UPD-Lite protocol, the sending end encapsulates the user plane tunnel data of the bearer through the UDP-Lite protocol.

Further, the determining unit in the embodiment is specifically configured to acquire a first threshold and a second threshold, determine, whether a code error resilient in the quality of service parameter of the bearer is greater than the first threshold and whether a packet loss tolerance in the quality of service parameter of the bearer is greater than the second threshold, and if both yes, obtain a determination result that the user plane tunnel data of the bearer can be encapsulated through the UDP-Lite protocol; otherwise, obtain a determination result that of the user plane tunnel data of the bearer cannot be encapsulated through the UDP-Lite protocol.

The fifth embodiment is a network element device proposed based on an existing 4G network, for example, S4 SGSN networking or EPC networking. The network element device in this embodiment determines the quality of service parameter of the bearer when creating or updating the bearer, and determines whether to encapsulate the user plane tunnel data of the bearer through UDP-Lite. For some bearers that can be encapsulated through UDP-Lite, especially services having a high packet error resilient such as audios and videos, this embodiment may output the determination result of whether the bearer can be encapsulated through UDP-Lite, so that the network element device of the receiving end can respond correspondingly according to the determination result, which can significantly improve data transmission efficiency as compared with the prior art in which all bearers are encapsulated through the UDP protocol.

Figure 19:
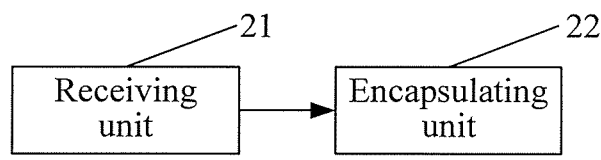
FIG. 19 is a schematic structural diagram of a sixth embodiment of a network element device according to the present invention.

As shown in FIG. 19, it is a schematic structural diagram of a sixth embodiment of a network element device according to the present invention. As shown in the drawing, the network element device includes: a receiving unit 21 and an encapsulating unit 22. The receiving unit 21 is configured to receive instruction information sent by a sending end, where the instruction information carries determination result information, and the determination result information is a result of determining, by the sending end according to a quality of service parameter of a created or updated bearer, whether a user plane tunnel data of the bearer can be encapsulated through a UDP-Lite protocol. The encapsulating unit 22 is configured to, when the instruction information carries determination result information indicating that encapsulation can be performed through the UPD-Lite protocol, encapsulate the user plane tunnel data of the bearer through the UDP-Lite protocol.

Further, the encapsulating unit in the embodiment is specifically configured to encapsulate the user plane tunnel data of the bearer into a data transmission protocol packet through the UDP-Lite protocol, and set a checksum coverage field in a packet header of the data transmission protocol packet to a preset value. For the selection of the preset value, reference may be made to related content involved in the foregoing data transmission embodiments, which is not repeated herein.

The sixth embodiment is a network element device proposed based on an existing 4G network, for example, S4 SGSN networking or EPC networking. The network element device in this embodiment determines, according to the determination result carried in the received instruction information, whether to encapsulate the user plane tunnel data of the bearer through UDP-Lite. For some bearers that can be encapsulated through UDP-Lite, especially services having a high packet error resilient such as audios and videos, the network element device of this embodiment may implement the UDP-Lite encapsulation, which can significantly improve the data transmission efficiency as compared with the prior art in which all bearers are encapsulated through the UDP protocol.

The present invention provides an embodiment of a communication system. The communication system includes at least one group of network element devices configured to transmit data. The group of network element devices includes at least two network element devices. The group of network element devices may be the network element devices described in the first embodiment and the second embodiment, as shown in the example of FIG. 3. The group of network element devices may further be the network element devices described in the third embodiment and the fourth embodiment, as shown in the examples of FIG. 6 and FIG. 7. The group of network element devices may further be the network element devices described in the fifth embodiment and the sixth embodiment, as shown in the examples of FIG. 10, FIG. 11, FIG. 12, and FIG. 13.

It should be understood by persons skilled in the art that the accompanying drawings are merely schematic diagrams of an embodiment, and modules or procedures in the accompanying drawings are not necessarily required for implementing the present invention.

It should be understood by persons skilled in the art that, modules in an apparatus in an embodiment may be distributed in the apparatus of the embodiment according to the description of the embodiment, or be correspondingly changed and located in one or more devices different from this embodiment. The modules of the foregoing embodiment may be combined into one module, or further divided into a plurality of sub-modules.

The sequence numbers of the foregoing embodiments of the present invention are merely for the convenience of description, and do not imply preference among the embodiments.

Those of ordinary skill in the art should understand that all or a part of the steps of the method according to the embodiments of the present invention may be implemented by a program instructing relevant hardware. The program may be stored in a computer readable storage medium. When the program is run, the steps of the method embodiments are performed. The storage medium may be any medium that is capable of storing program codes, such as a ROM, a RAM, a magnetic disk, and an optical disk.

Finally, it should be noted that the above embodiments are merely provided for describing the technical solutions of the present invention, but not intended to limit the present invention. Although the present invention has been described in detail with reference to the embodiments, persons of ordinary skill in the art should understand that: modifications can be made to the technical solutions described in the embodiments, or equivalent replacements can be made to some technical features in the technical solutions; and such modifications or replacements do not cause the essence of corresponding technical solutions to depart from the scope of the present invention.

What is claimed is:

1. A data transmission method, comprising:
receiving a create or update message of a PDP context or a bearer sent by a sending end, wherein the create or update message carries a quality of service parameter; and
determining, according to the quality of service parameter, whether user plane tunnel data of a bearer corresponding to the PDP context or a user plane tunnel data of the bearer can be encapsulated through a UDP-Lite protocol, and returning, to the sending end, a response message carrying determination result information, so that when the determination result information indicates that encapsulation can be performed through the UDP-Lite protocol, the user plane tunnel data of the bearer corresponding to the PDP context or the user plane tunnel data of the bearer will be encapsulated through the UDP-Lite protocol by the sending end.

2. The data transmission method according to claim 1, wherein, determining, according to the quality of service parameter, whether the user plane tunnel data of the bearer corresponding to the PDP context can be encapsulated through the UDP-Lite protocol, comprises:
acquiring a first threshold and a second threshold; and
determining, whether a code error resilient in the quality of service parameter is greater than the first threshold and whether a packet loss tolerance in the quality of service parameter is greater than the second threshold, and if both yes, determining that the user plane tunnel data of the bearer corresponding to the PDP context can be encapsulated through the UDP-Lite protocol.

3. A data transmission method, comprising:
sending a create or update message of a PDP context or a bearer to a receiving end, wherein the create or update message carries a quality of service parameter of the PDP context or the bearer;
receiving a create or update response message returned by the receiving end, wherein the response message is returned by the receiving end according to the create or update message, the response message carries determination result information, and the determination result information is a result of whether user plane tunnel data of a bearer corresponding to the PDP context or a user plane tunnel data of the bearer can be encapsulated through a UDP-Lite protocol determined by the receiving end according to the quality of service parameter; and
if the determination result information carried in the response message indicates that encapsulation can be performed through the UDP-Lite protocol, encapsulating the user plane tunnel data of the bearer corresponding to the PDP context or the user plane tunnel data of the bearer through the UDP-Lite protocol.

4. The data transmission method according to claim 3, wherein, encapsulating the user plane tunnel data of the bearer corresponding to the PDP context or the user plane tunnel data of the bearer through the UDP-Lite protocol comprises:
encapsulating the user plane tunnel data of the bearer corresponding to the PDP context into a data transmission protocol packet or the user plane tunnel data of the bearer through the UDP-Lite protocol, and setting a checksum coverage field in a packet header of the data transmission protocol packet to a preset value.

5. A data transmission method, comprising:
creating or updating a bearer, and determining, according to a quality of service parameter of the bearer, whether a user plane tunnel data of the bearer can be encapsulated through a UDP-Lite protocol; and
sending, to the receiving end, an instruction information carrying determination result information, so that when receiving the determination result information indicates that encapsulation can be performed through the UDP-Lite protocol, the user plane tunnel data of the bearer will be encapsulated through the UDP-Lite protocol by the sending end.

6. The data transmission method according to claim 5, wherein, determining, according to the quality of service parameter of the bearer, whether the user plane tunnel data of the bearer can be encapsulated through the UDP-Lite protocol, comprises:
acquiring a first threshold and a second threshold; and
determining, whether a code error resilient in the quality of service parameter of the bearer is greater than the first threshold and whether a packet loss tolerance in the quality of service parameter of the bearer is greater than the second threshold, and if both yes, determining that the user plane tunnel data of the bearer can be encapsulated through the UDP-Lite protocol.

7. A data transmission method, comprising:
receiving instruction information sent by a sending end, wherein the instruction information carries determination result information, and the determination result information is a result of whether a user plane tunnel data of the bearer can be encapsulated through a UDP-Lite protocol determined by the receiving end according to the quality of service parameter; and
if the determination result information carried in the instruction information indicates that encapsulation can be performed through the UDP-Lite protocol, encapsulating the user plane tunnel data of the bearer through the UDP-Lite protocol.

8. The data transmission method according to claim 7, wherein, encapsulating the user plane tunnel data of the bearer through the UDP-Lite protocol comprises:
encapsulating the user plane tunnel data of the bearer into a data transmission protocol packet through the UDP-Lite protocol, and setting a checksum coverage field in a packet header of the data transmission protocol packet to a preset value.

9. A network element device, comprising:
a receiving unit, configured to receive a create or update message of a PDP context or a bearer sent by a sending end, wherein the create or update message carries a quality of service parameter of the PDP context;
a determining unit, configured to determine, according to the quality of service parameter, whether user plane tunnel data of a bearer corresponding to the PDP context or a user plane tunnel data of the bearer can be encapsulated through a UDP-Lite protocol, so as to obtain a determination result; and
a sending unit, configured to return, to the sending end, a response message carrying the determination result information, so that when the determination result information indicates that encapsulation can be performed through the UDP-Lite protocol, the user plane tunnel data of the bearer corresponding to the PDP context or the user plane tunnel data of the bearer will be encapsulated through the UDP-Lite protocol by the sending end.

10. The network element device according to claim 9, wherein the determining unit is configured to:
acquire a first threshold and a second threshold; and
determine, whether a code error resilient in the quality of service parameter is greater than the first threshold and whether a packet loss tolerance in the quality of service parameter is greater than the second threshold, and if both yes, obtain a determination result that the user plane tunnel data of the bearer corresponding to the PDP context can be encapsulated through the UDP-Lite protocol.

11. A network element device, comprising:
a sending unit, configured to send a create or update message of a PDP context or a bearer to a receiving end, wherein the create or update message carries a quality of service parameter of the PDP context or the bearer;
a receiving unit, configured to receive a create or update response message returned by the receiving end, wherein the response message is returned by the receiving end according to the create or update message, the response message carries determination result information, and the determination result information is a result of whether user plane tunnel data of a bearer corresponding to the PDP context is capable of being encapsulated through a UDP-Lite protocol determined by the receiving end according to the quality of service parameter; and an encapsulating unit, configured to, when the determination result information carried in the response message indicates that encapsulation can be performed through the UDP-Lite protocol, encapsulate the user plane tunnel data of the bearer corresponding to the PDP context or the user plane tunnel data of the bearer through the UDP-Lite protocol.

12. The network element device according to claim 11, wherein the encapsulating unit is configured to:

when the determination result information carried in the response message indicates that encapsulation can be performed through the UDP-Lite protocol, encapsulate the user plane tunnel data of the bearer corresponding to the PDP context or the user plane tunnel data of the bearer into a data transmission protocol packet through the UDP-Lite protocol; and set a checksum coverage field in a packet header of the data transmission protocol packet to a preset value.

13. A network element device, comprising:

a creating or updating unit, configured to create or update a bearer;

a determining unit, configured to determine, according to a quality of service parameter of the bearer, whether a user plane tunnel data of the bearer can be encapsulated through a UDP-Lite protocol, so as to obtain a determination result; and a sending unit, configured to send an instruction information carrying determination result information to a receiving end, so that when the determination result information indicates that encapsulation can be performed through the UDP-Lite protocol, the user plane tunnel data of the bearer is encapsulated by the sending end through the UDP-Lite protocol.

14. The network element device according to claim 13, wherein the determining unit is configured to:

acquire a first threshold and a second threshold;

determine, whether a code error resilient in the quality of service parameter of the bearer is greater than the first threshold and whether a packet loss tolerance in the quality of service parameter of the bearer is greater than the second threshold; and if both yes, obtain a determination result that the user plane tunnel data of the bearer can be encapsulated through the UDP-Lite protocol, otherwise, obtain a determination result that the user plane tunnel data of the bearer cannot be encapsulated through the UDP-Lite protocol.

15. A network element device, comprising:

a receiving unit, configured to receive instruction information sent by a sending end, wherein the instruction information carries determination result information, and the determination result information is a result of whether a user plane tunnel data of the bearer can be encapsulated through a UDP-Lite protocol determined by the sending end according to a quality of service parameter of a created or updated bearer; and an encapsulating unit, configured to, when the determination result information carried in the instruction information indicates that encapsulation can be performed through the UDP-Lite protocol, encapsulate the user plane tunnel data of the bearer through the UDP-Lite protocol.

16. The network element device according to claim 15, wherein the encapsulating unit is configured to:

when the determination result information carried in the instruction information indicates that encapsulation can be performed through the UDP-Lite protocol, encapsulate the user plane tunnel data of the bearer into a data transmission protocol packet through the UDP-Lite protocol; and set a checksum coverage field in a packet header of the data transmission protocol packet to a preset value.

* * * * *